Sept. 15, 1931.  R. M. GALLOWAY  1,823,038
MACHINE TOOL UNIT
Filed April 14, 1928  7 Sheets-Sheet 7

Inventor
Robert M. Galloway
By Attorneys
Nathan + Bowman

Patented Sept. 15, 1931

1,823,038

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

MACHINE TOOL UNIT

Application filed April 14, 1928. Serial No. 270,140.

The present invention is concerned with certain problems and conditions steadily becoming more difficult to contend with in the art of machine tools. The invention centers around the conception and development of a machine tool unit having features of construction which render it capable of application in various machine tool assemblies in such a manner as to ultimately result in reducing costs to both the manufacturer and the purchaser of machine tools, and at the same time to provide a machine which by but small changes may be adapted to a large range of capacities and diverse usages.

Machine tools may be broadly classified as single purpose machines, particularly adapted for a certain type of work; and universal machines which are intended to be capable of performing varied operations. In general then, it may be stated that a manufacturer employing machine tools is confronted with the necessity of investing in a large number of single purpose machines to meet every particular job, or in a relatively lesser number of the more costly and complicated universal machines. As an added burden he must be equipped as to either type with machines whose capacity is equal to the maximum to be required for any particular work. In either case the cost and space required are almost prohibitive.

The manufacturer of the machine tools is likewise subjected to high cost of production and investment. To meet the demands of the trade he must furnish both universal and single purpose machines and of all capacities which obviously requires innumerable patterns, castings and operations.

The present invention is adapted to meet many of these problems by a system of removable and interchangeable units, the various elements of which may be combined and assembled in different ways to provide a large range of machines of varied types and capacities. Tapping machines are examples of those which must be made of such varied capacities and the present invention is peculiarly adapted to meet the conditions and problems present in tapping operations.

A common construction in tapping machines includes a plurality of tapping spindles assembled together in a single cluster box or frame and adapted to be advanced in some manner to perform their individual tapping operations. The number of these spindles which may be mounted in a unitary frame may vary from one or two to a number many times that amount. It may be seen, therefore, that the power and driving mechanism must likewise vary through a relatively large range.

The present invention is designed to meet this situation in a very practical and economical manner by the provision of driving units of relatively small capacities, but so designed that a plurality of these may be combined and separately connected to the mechanism or spindles to be operated. Each unit is a complete self-contained organization including a motor, driving mechanism, reversing means, and manual and automatic control means.

In the type of tapping machine mentioned wherein a plurality of taps are mounted in a unitary cluster box, each of the taps is provided with an individual lead screw. Since the driving unit, therefore, is required to supply rotary motion only, it may be of much more compact arrangement. Also, since each spindle is controlled by its individual lead screw, no particular relation need be maintained between the respective spindles and each driving unit may be connected to a certain group of these spindles to operate independently of the other driving units.

The idea of providing individual driving units has still further application in building up a complete machine tool having a plurality of working stations. Such a machine may consist of a main supporting frame, and rotary table mounted therein and a plurality of individual self-contained units mounted on the frame in angularly displaced positions to successively perform their respective work operation as the table carrying the work is successively indexed.

The features of construction noted, therefore, permit the building up of a machine of any desired type and capacity in a most inexpensive and convenient manner and the resultant machine is in appearance and strength the equal of any machine tool especially and completely designed for the purpose intended.

By making the individual driving units of standard size and readily interchangeable and of such compactness that they may be readily combined results in a reduction of initial cost and enables a complete machine tool to be quickly and cheaply assembled. Likewise the purchaser of such unit may disassemble and recombine them in any manner desired to result in a machine tool especially adapted to meet his changing and immediate requirements.

Other objects of the invention are to be found in details of the reversible transmission of the unit. Multiple disk clutches are provided which enable the employment of a quick, snap action reversing means without injury to the machine or without any sudden jar, or undesirable strain thereon. The control means have been extremely simplified and condensed, thereby rendering the unit very compact and contributing to the ultimate objects of being able to combine any desired number of the units to build up a sturdy, compact machine tool.

As a further feature to this invention, fluid pressure means are provided in combination with automatic control means for initiating the cycle, and also providing an emergency control to reverse the tapping operation at any desired time upon the happening of any unusual circumstance. A single valve means provides a convenient control for the fluid pressure. Such a control system enables the machine tool unit to be mounted on any type of frame and in any desired position, and controlled from a remote station.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
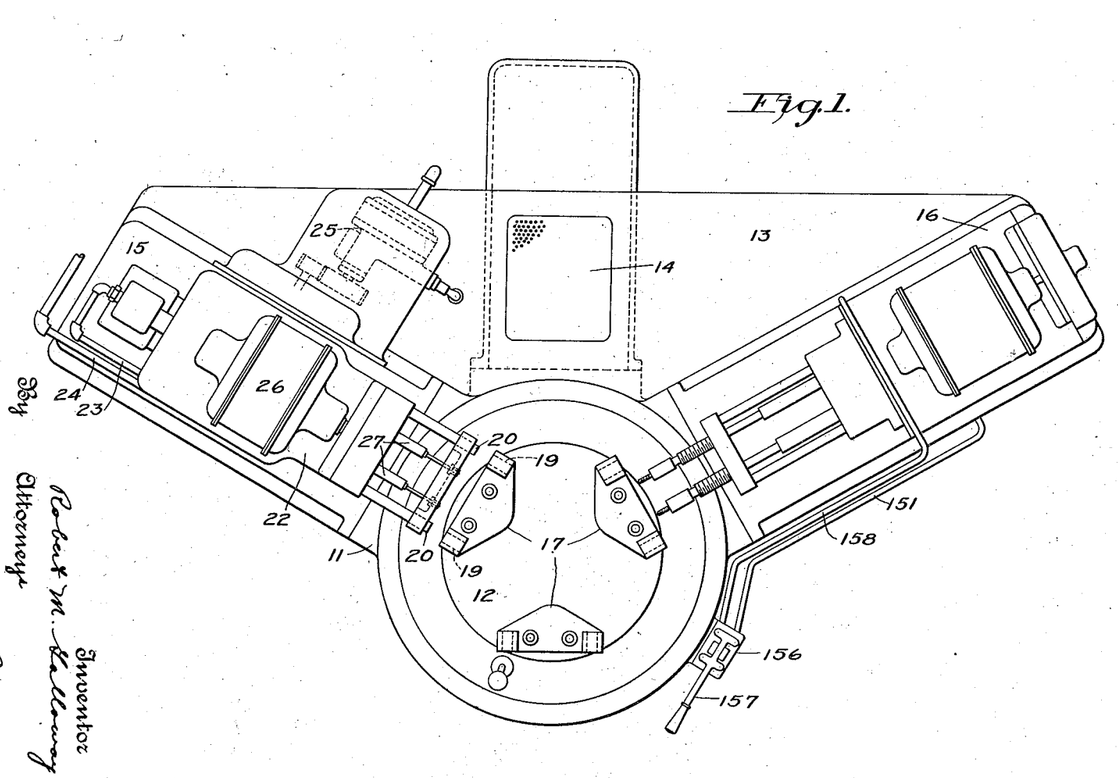
Figure 1 illustrates a built up machine tool of the general type referred to herein.
Figure 2:
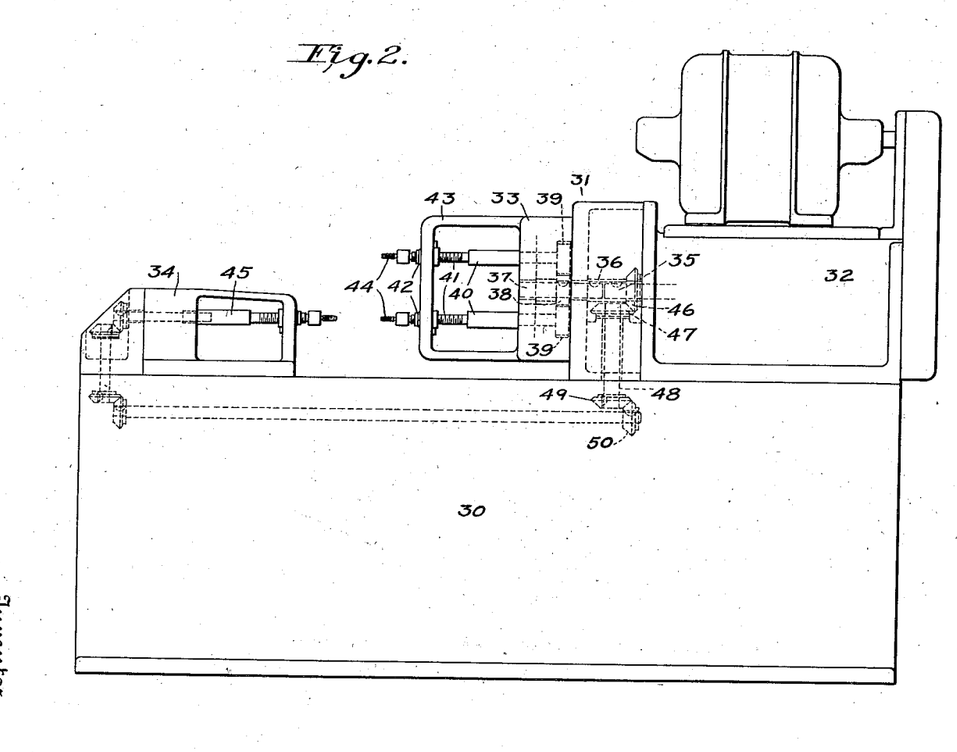
Fig. 2 illustrates another and more simplified application of the machine tool tapping unit.

The manner in which the individual driving units may be combined to form various machine tools or tapping units will be first described as exemplified, for example, by the construction shown in Figs. 1 and 2. Fig. 1 illustrates a complete machine tool having the general elements comprising the main frame or base 11, a work-table 12 rotatably mounted in the frame; a chip-pan 13 integral with the main frame and having a sunken portion with a screen 14 therein forming a drain for the coolant. Various machine tool units may be secured to the frame in any desired position dependent upon the type of work to be performed. As shown herein, 15 indicates a drill unit and 16 a tapping unit. It is to be understood, however, that these units may vary in number and in type and may consist of any desired combination of various type units such as drill units, tapping units, spot facing units, or milling units.

In the present case these units are both shown horizontally arranged. It is apparent, however, that any one or all of these units may be vertically arranged or at any desired intermediate angle, dependent upon the type of unit and the work to be performed. The complete tapping unit shown in Fig. 3, for example may be conveniently arranged in a vertical position in place of the unit 16, and secured to the frame in position to project over the work table 12 and adapted to act on the work mounted thereon.

If desired bracket 17 may be provided having bearings 19 adapted to receive the guides 20 carried by any of the units which require steadying such as the drill unit 15.

The drill unit 15 is illustrative of one of the many types of units which may be assembled in the manner disclosed, and the specific construction thereof further forms no part of the present invention, its construction consisting in general of a hydraulically translated frame 22 supplied with hydraulic fluid through the pipe connections 23 and 24. A hydraulic pump is indicated at 25 for supplying pressure fluid. An electric motor 26 is suitably geared to rotate the drill spindles 27. The details of the tapping unit 16, forming an important feature of this invention, will be described more in detail hereinafter.

A second organization rendered possible by the type of driving unit comprising this invention is illustrated in Fig. 2 and consists of the base 30, having supported thereon a removable self-contained tapping unit 31, which broadly includes the driving unit 32 and the tapping spindle and lead screw assembly 33. Mounted on the frame 30 in opposed relation to the tapping unit 31 is the tapping fixture 34 adapted to receive its power from the driving unit 32 and to operate in accordance with the tapping spindles and lead screw assembly 33.

The details of the driving unit 32 will be later described, but for the present it may be stated that this driving unit includes all the elements of a complete self-contained unit having all the necessary transmission and control mechanism to impart forward and reverse rotations to the drive shaft 35. The drive shaft 35 is connected by a coupling to a short shaft 37 to which is keyed a gear 38, the gear 38 serving to drive the gears 39, and thereby the spindles 40, to rotate the screws 41. Nuts 42 are fixed in the frame 43, whereby the taps 44 are provided with individual lead screws and are, therefore, both translated and rotated by rotation of the drive shaft 35.

The auxiliary tapping spindle 45 is simultaneously and similarly driven from the driving unit 32 through a system of gears comprising bevel gears 46 and 47, shaft 48, gears 49 and 50, and on through the illustrated connection of Fig. 2. The number and type of spindles driven may, of course, be varied, the construction shown being intended to illustrate the various adaptations of the driving unit which may be resorted to to form a desired machine tool unit. A single driving unit as herein shown serves to supply the power and control for an arrangement forming substantially a duplex machine.

Figure 3:
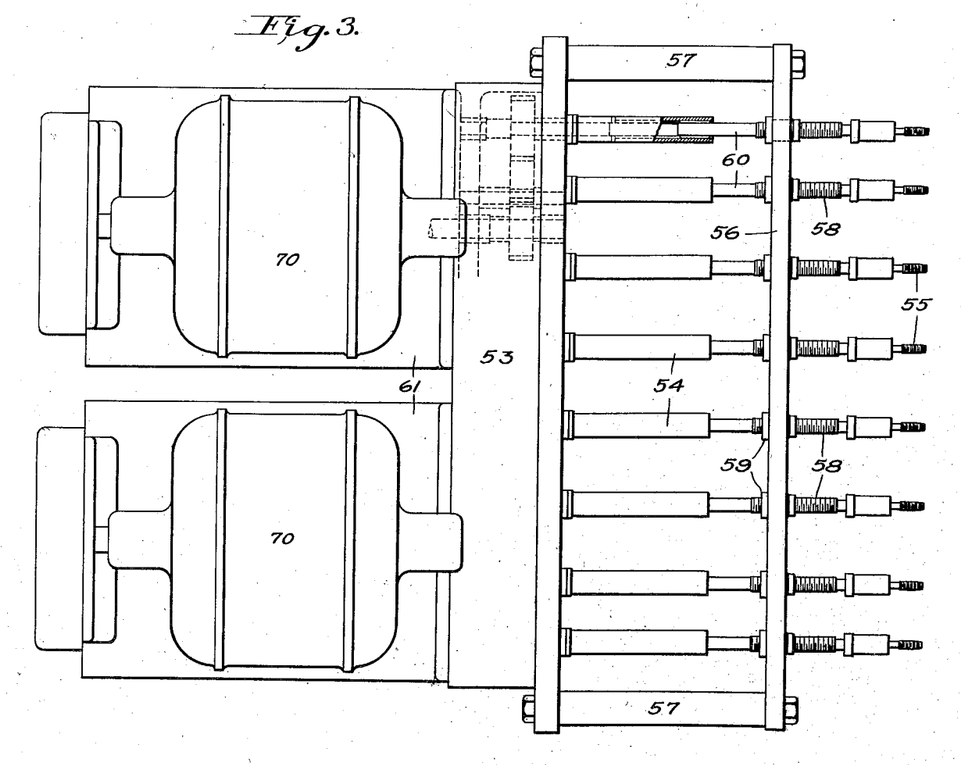
Fig. 3 is a plan view of a tapping unit embodying a feature of this invention.

The construction in Fig. 3 illustrates features of the invention specifically relating to tapping units and comprising a cluster plate or box 53, carrying a plurality of spindles 54 adapted to furnish rotary movement to the taps 55. This structure forms a unitary assembly of tap spindles which is often employed to operate on a work object, such as a crank case having a plurality of holes therein, which may be simultaneously tapped by the arrangement shown. Attached to the frame portion 53 is the plate 56, being rigidly secured thereto through the spacer members 57. Each tapping spindle is provided with an individual lead screw 58 and a nut 59 rigidly mounted in the plate 56, but readily removable therefrom, whereby lead screws and nuts of different pitch may be substituted. The spindles 54 are each provided with a splined connection to the respective shafts 60. With such an arrangement driving units are required to furnish rotary movement only, the translatory movement of the taps being suitably provided from the cooperation of the individual lead screw and the splined connection between the shaft 60 and the rotary spindles 31.

Within the plate, or casing 53, are housed suitable drive gears for imparting rotation to the individual spindles from one or more of the driving units 61. As previously noted in connection with Fig. 2 each driving unit has projecting from the forward face thereof a rotary shaft 35 shown more clearly as projecting from the left in Fig. 8. As shown at the left in Fig. 4 a gear 62 is keyed to the shaft 35 and meshes with a gear 63 mounted on a stub-shaft, which gear in turn meshes with gears 64, 65 and 66 rigid with the respective spindles 54. A gear 67, likewise mounted on a stub-shaft, serves to convey rotary motion from gear 64 to the spindle gear 67'. By a similar arrangement of gears the drive unit to the right in Fig. 4 serves to independently drive four other of the taps 55.

Figures 4, 8:
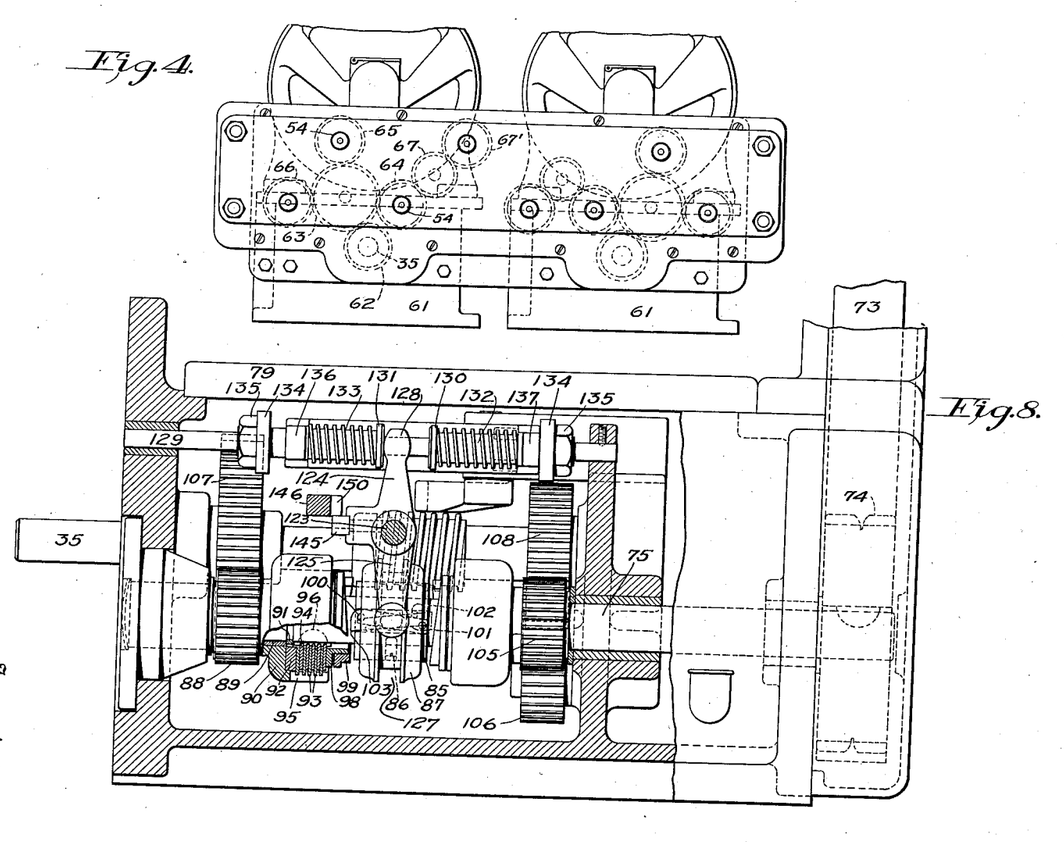
Fig. 4 is an elevational view looking from the right in Fig. 3.
Fig. 8 is a side elevational view thereof, disclosing the details of the clutch unit.

The cluster of tap spindles shown in Figs. 3 and 4 is illustrative of a unitary assembly of taps, such as may ordinarily be employed to simultaneously operate on the work object. Other arrangements may be resorted to having different spacing of the spindles and being of lesser or greater number in accordance with the particular work to be performed.

By the use of the individual lead screws the spindles may be independently operated and the cluster plate may be so adapted that each driving unit has a driving connection to a certain group of the spindles independently of the remaining ones. The driving units are readily detachable from the cluster plate, which plates may be designed to receive one or more driving units, which ordinarily are of standard and relatively small capacity, the number employed being dependent upon the total power required by the group of tool spindles.

Figure 6:
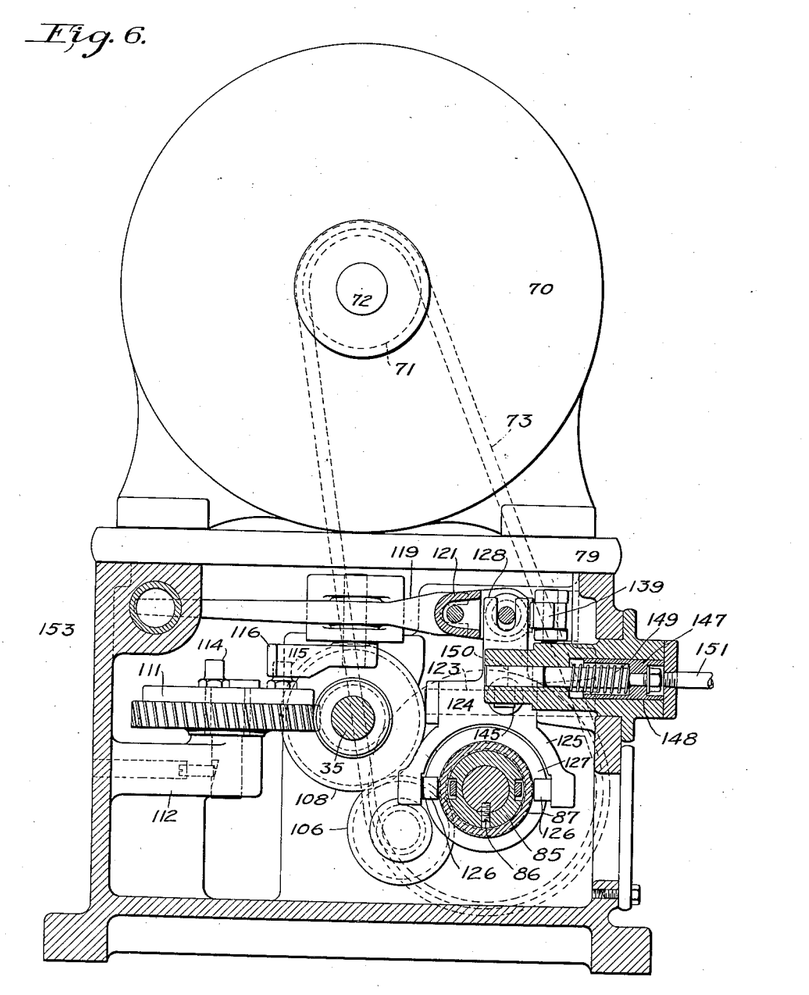
Fig. 6 is an end view of a driving unit with the casing broken away to disclose the transmission mechanism in the base thereof.
Figure 7:
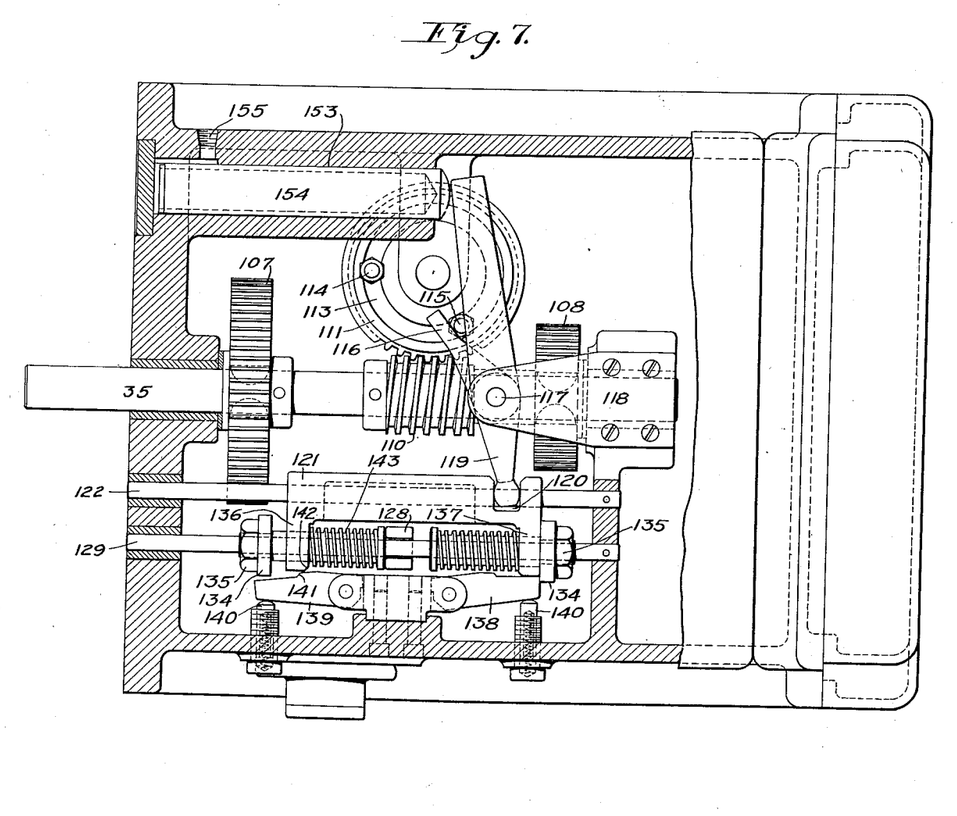
Fig. 7 is a plan view in section through the base of the driving unit.

Each of the driving units, of which one is shown in Figs. 6 to 8, are made of a standard size and capacity and are interchangeable. Two or more of these driving units may be combined to form a complete self-contained machine tool unit of relatively large capacity. With such a standardization of the elements the cost of production of machine tool units in general may be reduced, and further may be readily disassembled and reassembled by the purchaser to form a single-purpose machine tool, especially adapted for his immediate requirements. These machine tool units may be assembled on a main frame as shown in Figs. 1 and 2 in an assembly of operative elements especially adapted to perform a plurality of operations on a particular type of work.

The prime mover in each of these units may consist of an electric driving motor 70 of a suitable capacity, having the sprocket 71 secured on the motor shaft 72. A flexible chain 73 connects the motor to the sprocket 74 secured on the shaft 75. A suitable chain housing 76 is provided.

Figure 5:
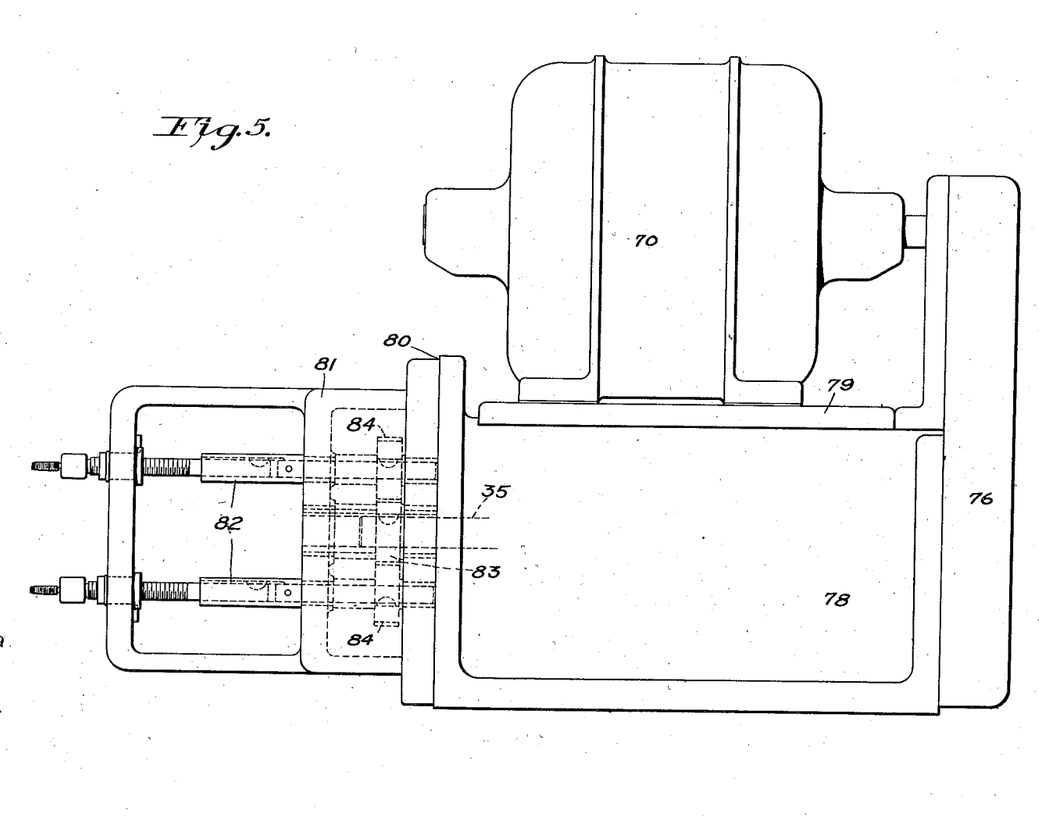
Fig. 5 is a side elevational view of a tapping unit in one of its simplest forms.

A simple application of the unit is shown in Fig. 5 wherein the structure includes the base 78 enclosing the driving unit provided with a detachable cover plate 79, upon which is mounted the electric driving motor 70.

The forward face 80 of the base portion is adapted to have rigidly secured thereto by suitable screw bolt means the cluster box or frame assembly 81 having, in the present case, the two spindles 82 provided with the lead screws and related mechanism heretofore described in connection with the other figures. The driving shaft 35 is indicated in dotted lines and has keyed thereto the driving gear 83, meshing with the driven gears 84 secured to the spindles 82.

Reference is now made to Figs. 6 to 8 for the more specific details of the operating mechanism of the driving unit. The previously mentioned shaft 75 driven from the chain 73 has mounted thereon, the sleeve 85 secured on the shaft by means of a pin 86. Slidable on the sleeve and rotatable therewith is the clutch collar 87. Loosely mounted on the shaft 75 is the forward driving gear 88, having a bearing sleeve 89.

The double clutch about to be described is of multiple disk friction type, the opposed elements of which are similar, and therefore only one part will be described. The driving gear 88 has integral therewith the spider 90. A split ring 91 occupying a groove in the drive shaft 75 serves to hold the parts in position. The split ring 91 forms a shoulder for and is surrounded by the plate 92. Coacting friction plates 93 and 94 alternately arranged are provided. The friction plates 93 have tongues fitting within the slots 95 of the spiders 90 to rotate therewith. Keys 96 suitably spaced around the shaft 75 at, for example, angular distances of 120° project into slots in the plates 94, whereby the plates 94 are made rotatable with the shaft. A plate 98 mounted on the shaft 75 has an annular screw threaded portion, upon which is threaded the adjustable cam plate 99.

The sleeve 85 has pivoted thereto at 100 the cam lever 101. Secured to the sleeve 87 is a pin 102. Movement of the collar 87 to the left causes the cam lever to be rotated clockwise and the point 103 of the cam lever 101 to engage the cam 99 to force it to the left and exert pressure on the friction plates whereby gear 88 is caused to rotate without the shaft 75. The reverse driving gear 105 is driven in like manner, the construction being identical and need not, therefore, be specifically described. Reverse driving gear 105 meshes with idler gear 106.

Keyed upon the driven shaft 35 are the gears 107 and 108 meshing with the gears 88 and 106 respectively, whereby forward and reverse rotations are imparted to the driven shaft 35.

The details of the clutch shifting mechanism will now be described, and include a worm 110 secured to the driven shaft 35, meshing with a worm gear 111, having a bearing in the bracket 112. The upper face of the gear 111 has therein the slot 113 in which are adjustably mounted the actuating pins or dogs 114 and 115.

The gear 111 is adapted to oscillate whereby the actuating pins 114 and 115 alternately engage the pivoted lever 116 secured to the pin 117 mounted in bracket 118. Secured to the same supporting pin 117 is the double arm lever 119, one end of which engages in the opening 120 of the yoke 121, slidably mounted on the bolt 122.

A load and fire mechanism is provided for imparting a quick action to the clutch shifting means. Such mechanism includes a lever 124 pivoted on the pin 123. The lever 124 is provided with a clutch shifter fork 125, having pins 126 engaging in the groove 127 of the clutch collar 87. The opposite end of the lever 124 has a forked portion 128 projecting around the shaft 129 and occupying a position between the two collars 130 and 131. The collars 130 and 131 are integral with the spring barrels 132 and 133 respectively, which are slidably mounted on the shaft 129. The outer ends of the sleeves are provided with washers 134 and secured thereon by nuts 135. The sleeves mentioned are also slidable in openings within the projecting ears 136 and 137 of the yoke 121.

Pivoted to a bracket secured to a wall of the base portion are the latches 138 and 139 normally urged toward the yoke by means of spring pressed pins 140. The respective latches are adapted to engage the shoulder presented by the washers 134. Movement of the yoke 121 serves to trip the latch members by reason of the engaging cam surfaces 141 and 142 of the latch members and shiftable yoke respectively.

The shaft 35 is provided in the present instance with a left handed worm 110, whereby it is adapted to rotate the mechanism shown in Figs. 2 and 5 as right hand taps and the normal forward rotation of the shaft 35 is, therefore, intended to be in a clockwise direction, looking from the left in Fig. 7. For different arrangements and for different pitch taps the driving unit may be provided with worms 110 and worm gears 111 of different pitch and the driving motor reversed in direction. In Fig. 7 oscillation of the worm gear 111 causes the pin 115 to engage the lever 116, whereby the yoke 121 has been moved to the right, placing the spring 143 under compression until released by engagement of the cam 141 by the cam surface 142 tripping the latch and permitting the spring 143 to shift the lever 128 in a clock-wise direction in Fig. 8 to cause the forward drive through gear 88 to take place. The forward drive continues until pin 114 engages lever 116, thereby causing the reverse operation of the clutch shifting means just described.

In so far as the operation has been described, it is continuous. Means, however, are provided for causing the mechanism to operate through a single cycle of forward and reverse rotations, at the completion of which it is locked in neutral position. Such is the position shown in the drawings. The locking means comprises an arm integral with the lever 123 carrying an interference block 145. Such block normally engages the slide 146 secured to the piston 147, slidable in cylinder 148. The slide is normally urged to the right in Fig. 6 by a spring 149. The slide 146 has therein a notch 150. Admission of air to the cylinder 148 through the pipe 151 causes the piston and slide to move to the left in Fig. 6 to a position where the block 145 is permitted to move upwardly therethrough and the clutch is permitted to be moved to the forward driving position. If air pressure is then released from the cylinder the slide will be maintained in this position until the clutch has been actuated to the reverse position, whereupon the slide is released and the spring moves the piston back to the position shown and thereafter the clutch shifting fork is restrained in the inoperative position shown in Figs. 6 to 8 until it is again tripped by admission of air to the cylinder. If the air pressure is allowed to remain on in the cylinder, the operation, it may be noted will be continuous.

In the normal operation of a tool an emergency often arises wherein it is desired to stop operation and return the tools to their retracted position. Such a control is provided herein and consists of a cylinder 153 integral with the casing having slidably mounted therein the piston 154. The inner end of the piston engages an extended arm of the lever 119. Admission of air to the cylinder through the connection 155 serves to actuate the clutch to the reverse position.

The fluid pressure control means is illustrated in Fig. 1 and as shown therein is of a type which permits of a remote control of the unit irrespective of the position of the driving unit. The control valve indicated at 156 may be a commercial type of valve such as the well known Ross fourway operating valve non-locking type. Operation of the handle 157 about an axis parallel to the plane of the paper in one direction serves to admit fluid to the pipe 151, leading to the trip cylinder 148, whereas operation in the opposite direction serves to admit air to the pipe 158, leading to the emergency trip cylinder 153. In the mid position of the lever 157, both pipes 151 and 158 are open to the atmosphere.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A machine tool combining a rotatable member; power driven mechanism; clutch mechanism for connecting said power driven mechanism to said rotatable member; automatic means for operating said clutch means; means for releasably holding said automatic means in neutral position; and fluid pressure means for tripping said holding means to release said automatic means whereby the clutch is thrown into engagement.

2. A machine tool driving mechanism combining a frame; a power rotated shaft mounted therein; a second rotary shaft; forward and reverse driving connections including shiftable clutch means for driving said second shaft from said first shaft in forward and reverse directions; clutch shifting means; and means for automatically operating said clutch shifting means in accordance with the forward and reverse rotation of said second shaft comprising an oscillatable member geared to said second shaft, adjustable dogs on said oscillatable member, and a movable member having connections at one end to said clutch means and adapted to be alternatively engaged at the other end by said dogs.

3. A machine tool driving means combining a supporting frame; a power driven shaft mounted therein; a second rotary shaft; forward and reverse drives therefor from said power shaft including shiftable clutch means; a clutch shifting lever; a slidably mounted member adapted to engage said lever; a second member slidably mounted adjacent said first member; a second lever engaging said second member; means for operating said second lever in accordance with the rotation of said second shaft; and a load and fire mechanism between said slidable members for actuating said clutch shifting lever.

4. Driving means for machine tool mechanism combining an operating shaft adapted to be connected to the driven mechanism; a power driven shaft; a reversing clutch mechanism for connecting said power shaft to said operating shaft; automatic means for operating said clutch mechanism; means for releasably holding said clutch in inoperative position; fluid pressure actuated means for moving said clutch to reverse position; fluid pressure means for releasing said holding means; and a single valve means for controlling both of said fluid pressure means at will.

5. A machine tool driving mechanism combining a frame; a power rotated shaft mounted therein; a second rotary shaft; forward and reverse driving connections for driving said second shaft from said first shaft; clutch means therefor; shifting means for said clutch means; a lever engaging said shifting means; means operated in accordance with the forward and reverse rotation of said second shaft for moving said lever to operate said shifting means; auxiliary additional means for shifting said clutch comprising a fluid pressure operated piston adapted to engage said lever upon admission of fluid thereto to move said clutch means into reverse; and manual control means for admitting pressure fluid to act on said piston at will.

6. A machine tool driving mechanism combining a frame; a power rotated shaft mounted therein; a second rotary shaft; forward and reverse driving connections for rotating said second shaft from said first shaft; shiftable clutch means therefor; automatic means for operating said clutch into forward and reverse drives; latch means adapted to engage said clutch operating means at the completion of a cycle of forward and reverse operation to hold it in neutral position; fluid pressure operated means for tripping said latch means; and manually controlled means for admitting fluid pressure thereto to trip said latch means or to maintain said latch means in inoperative position whereby said cycle is continuously recurrent as desired.

7. A machine tool combining a rotatable member; power driving means; clutch and reverse mechanism for connecting said driving means to said member to rotate the latter in forward and reverse directions; automatic means for operating said clutch means to either forward or reverse position; fluid pressure emergency means operative to shift said clutch means to reverse only; and manually operative means to admit fluid to said fluid pressure means at will.

In witness whereof, I hereunto subscribe my name.

ROBERT M. GALLOWAY.